(No Model.)

C. MERRICK.
CLEANER FOR DISK HARROWS.

No. 467,862. Patented Jan. 26, 1892.

Witnesses
Geo. E. Frech.
Roland Fitzgerald.

Inventor
Clinton Merrick
per
Lehmann & Pattison
Attys.

UNITED STATES PATENT OFFICE.

CLINTON MERRICK, OF FOREST CITY, IOWA.

CLEANER FOR DISK HARROWS.

SPECIFICATION forming part of Letters Patent No. 467,862, dated January 26, 1892.

Application filed August 10, 1891. Serial No. 402,289. (No model.)

*To all whom it may concern:*

Be it known that I, CLINTON MERRICK, of Forest City, in the county of Winnebago and State of Iowa, have invented certain new and useful Improvements in Cleaners for Disk Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in cleaners for disk harrows; and it consists in the particular construction and arrangement of the cleaners, which will be fully described hereinafter, and particularly referred to in the claims.

The object of my invention is to provide a cleaner for the disks of harrows which will thoroughly clean the disks of all grass, stubble, and mud in such a manner that the harrow can be used in early spring when the soil is very damp, which makes the ordinary disk harrow useless with the usual cleaner, and to so construct these cleaners that the draft of the harrow in wet soil is from one-fourth to one-third lighter.

The present plan of cleaning is by a knife-scraper or small wheel, which is placed close to the concave surface of the disks, which causes the pressure of this knife or wheel against the disks to act like the brake on a wagon, which very materially increases the draft, and also gathers grass, straw, &c., until it entirely clogs the disks, making them a compact roller, which requires a great deal of time to clean them. Another plan is to use a horizontal cleaner, which extends between the disks and by pressure forces the soil out; but in this instance the draft of the harrow is very materially increased.

In contradistinction to these my invention is so constructed that it knocks or punches out the soil which attempts to enter between the wheels from the top, which will materially decrease the draft of the machine and do good work in as wet soil as the team can travel over.

Figure 1:
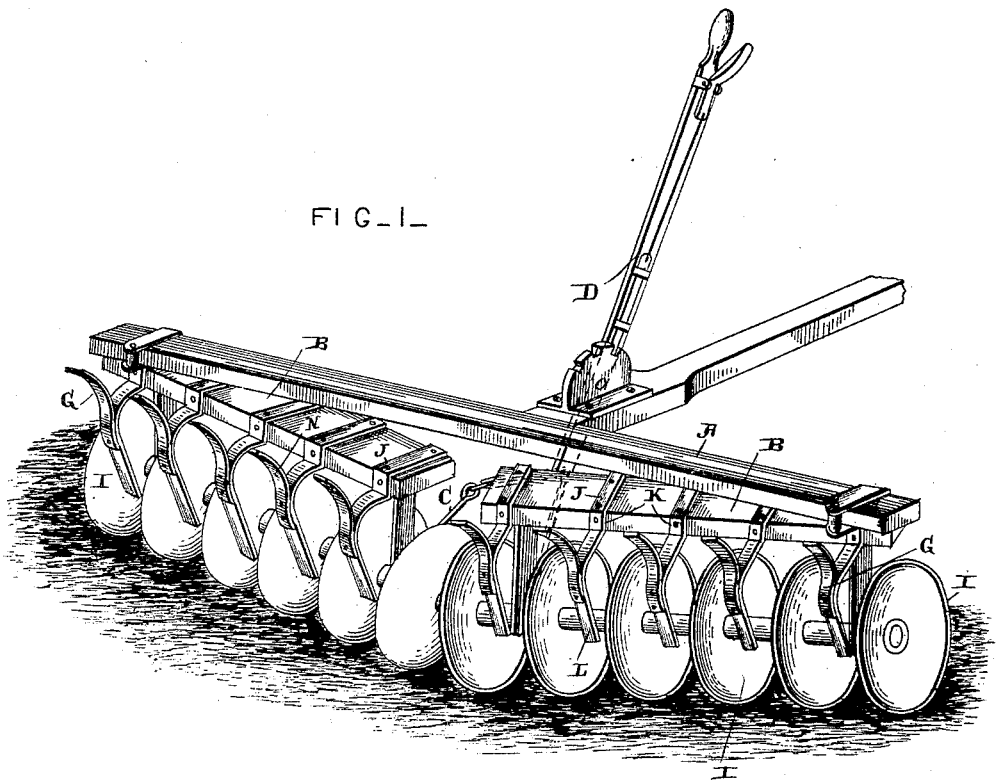
Figure 2:
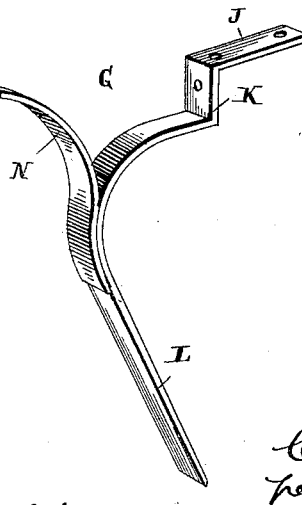

Figure 1 is a perspective view of a harrow which embodies my invention. Fig. 2 is an enlarged perspective view of one of the cleaners detached.

A indicates the frame of a disk harrow, to the ends of which the beams B of the disk sections are hinged in the usual manner. These beams B are connected by means of links or rods C to the lower end of a lever D, by means of which the angle of the two beams is regulated at will, as will be readily understood. Secured to the rear and upper surfaces or edges of these beams B are the cleaners G, which have their lower ends to extend between the disks I, as shown.

The cleaners G consist of the upper horizontal ends J, which are secured to the upper surfaces of the beams B by means of bolts or screws, and the vertical portions K, which are likewise screwed or bolted to the rear edges of the said beams. From the lower end of this vertical portion K the cleaners are bent outward to form a spring L, and then they are gradually bent inward, which forms a sort of a wedge for knocking out the soil. The lower ends of these cleaners extend inward and are just above the axles and slightly in rear thereof, so that any soil which attempts to adhere to the axle or the disks is punched and wedged outward and rearward by the cleaners, as will be seen. Owing to this peculiar shape of the cleaners and their special relative position to the disks and the axle, the mud and wet soil are removed much easier than by the ordinarily-shaped cleaner, whereby the draft of the machine is greatly reduced, and the machine is adapted to be used in soils which are too wet and sticky for a harrow which is supplied with the ordinary cleaner.

In order to facilitate the throwing off of the mud and preventing it from adhering to the cleaners themselves or from rising along the outer side of the cleaners and adhering to the beams B, I provide the cleaners with the upwardly-extending portions N, which are curved inward from their point of attachment to the cleaners proper and then their upper ends bent outward, as shown. By means of this curved extension the mud which rises along the outer side of the cleaners as it is throwing it from between the disks is lifted up and, owing to its own weight, falls off in rear of the machine.

It will be seen that by my arrangement the cleaners are attached to the beams B, so that they do not change their relation to the disks when the angles of the beams are adjusted, as would be the case if they were secured to the frame of the machine, and they are thus prevented from being at one time nearer to the surfaces of the disks than at another, which avoids an increased draft, owing to the proximity of the cleaners to the disks at any time.

Having thus described my invention, I claim—

1. A cleaner for disk harrows, consisting of a piece having a horizontal and a vertical portion at its upper end, an outward bend below the vertical portion, and its lower portion bent inward gradually, substantially as set forth.

2. A cleaner for disk harrows, consisting of a piece having its upper portion attached to the beam thereof and its lower end extending downward, and an upwardly-extending arm which has its rear end projecting in rear of the said cleaner proper, substantially as specified.

In testimony whereof I affix my signature in presence of two witnesses.

CLINTON MERRICK.

Witnesses:
B. A. PLUMMER,
W. O. HANSON.